United States Patent [19]

Reed, deceased et al.

[11] Patent Number: 5,268,151
[45] Date of Patent: Dec. 7, 1993

[54] APPARATUS AND METHOD FOR GENERATING OZONE

[75] Inventors: Bruce A. Reed, deceased, Visalia; Donald R. Randall, Clovis, both of Calif.

[73] Assignee: Ozone Equipment, Inc., Houston, Tex.

[21] Appl. No.: 595,961

[22] Filed: Oct. 12, 1990

[51] Int. Cl.[5] ............................................. B01J 19/12
[52] U.S. Cl. ........................... 422/186.16; 422/186.18
[58] Field of Search ...................... 422/186.15, 186.16, 422/186.18

[56] References Cited

U.S. PATENT DOCUMENTS

| | | | |
|---|---|---|---|
| 3,800,210 | 3/1974 | Caussin | 321/9 R |
| 3,905,920 | 9/1975 | Botcharoff | 250/536 |
| 3,942,093 | 3/1976 | Lowther | 321/45 R |
| 4,016,060 | 4/1977 | Lowther | 204/176 |
| 4,283,291 | 8/1981 | Lowther | 250/536 |
| 4,320,301 | 3/1982 | Kogelschatz | 422/186.18 |
| 4,504,445 | 3/1985 | Walz | 422/186.15 |
| 4,603,031 | 7/1986 | Gelbman | 422/186.18 |
| 4,869,881 | 9/1989 | Collins | 422/186.18 |
| 4,966,666 | 10/1990 | Waltonen | 204/164 |
| 4,988,484 | 1/1991 | Karlson | 422/186.19 |
| 5,091,069 | 2/1992 | Hendrickson et al. | 204/176 |
| 5,147,614 | 9/1992 | Conrad | 422/186.18 |

Primary Examiner—Donald P. Walsh
Assistant Examiner—Daniel Jenkins
Attorney, Agent, or Firm—Sroufe, Zamecki, Payne, Lundeen

[57] ABSTRACT

A corona discharge generator is disclosed, and includes a central tube of electrically conducting material circumscribed by a glass tube having an electrically conducting coating on its exterior surface and being sealed to the exterior surface of the central tube at opposites ends of the glass tube. The central tube is blocked within the longitudinal extent of the glass tube, and provided with holes between the interior of the central tube and the annular enclosure formed between the central tube and the glass tube, toward the opposite ends of the glass tube. Oxygen-containing gas flows along the central tube, out a first hole or holes to the enclosure, along the enclosure and back through one or more holes into the central tube on the downstream side of the blockage. A pulsed electrical signal is applied to the two tubular electrodes to effect a corona discharge within the enclosure, thereby producing ozone. An electrical circuit is disclosed to provide such a pulse signal of variable frequency whereby the rate of production of ozone may be selected.

8 Claims, 3 Drawing Sheets

APPARATUS AND METHOD FOR GENERATING OZONE

BACKGROUND OF THE INVENTION

1. Field of the Invention

The present invention pertains to techniques for producing ozone. More particularly, the present invention relates to methods and apparatus for apply an appropriate electric field across an oxygen-containing atmosphere to break oxygen molecules ($O_2$) into atoms (O) which may then regroup as ozone ($O_3$). A high voltage signal is used to produce a corona discharge between electrodes, within which oxygen-containing gas is positioned, whereupon the above interaction occurs to produce ozone. Ozone has many commercial and scientific uses including, for example, disinfection, reduction of toxicity, odor control, organic oxidation and removal, and removal of suspended solids.

2. Description of Prior Art

Various techniques are known for arranging the electrodes across which an electrical signal is provided to produce ozone. One method of arranging the electrodes is to provide parallel plates as electrodes. Another general form of electrode arrangement involves a central wire serving as one electrode and an outer cylindrical tube providing a second electrode. Concentric tubular electrodes are also known.

Various known arrangements for producing ozone may employ circulation of coolant fluid to overcome any excess heat generated in the process. Additionally, a given electrode arrangement may be particular sensitive to misalignment.

It is advantageous and desirable to provide an ozone generator whose electrodes are relatively easily mutually oriented, and wherein the orientation of the electrodes may be maintained without any difficulty. It is further desirable and advantageous to provide an ozone generating system which produces ozone efficiently with minimal heat generation, and wherein the ozone may be generated relatively rapidly. Relative compact size would also be a desirable feature of an ozone generator. Additionally, the ability to easily vary the rate at which ozone is being generated in a given flow of oxygen-containing gas, for example, is another desirable feature.

SUMMARY OF THE INVENTION

The present invention provides an ozone generator including a central tube of electrically conducted material surrounded by a second tube of generally non-electrically conducting material, with the two tubes positioned mutually coaxially. Seals are positioned toward the two ends of the second tube, which may be shorter than the central tube, to seal the interior surface of the second tube to the exterior surface of the central tube. An enclosure is thus formed comprising the annular region between the outer surface of the central tube and the inner surface of the second tube, and between the two seals. Electrically conducting material covers the outer surface of the second tube. Thus, two coaxial cylindrical electrodes are formed comprising the central tube and the cover on the outer surface of the second tube. An electrical signal may be applied between these electrodes to produce a corona discharge within the annular enclosure.

The central tube, which may be made of metal such as stainless steel, features holes through the wall of the tube located toward opposite ends of the second tube, generally just inside the enclosure from the positions of the two seals. The longitudinal central passageway of the central tube is blocked between the two positions of the holes; the blockage may be generally located about midway of the longitudinal extent of the enclosure. Thus, a flow passage for gas for use in the production of ozone is formed, starting along the central passage of the central tube to the first hole or holes at one end of the enclosure, through those holes into the enclosure, along the enclosure toward the opposite end thereof and through the holes at that opposite end back to the interior of the central tube, thus, bypassing the blockage of the central passage of the central tube. While the gas is in the enclosure, an electrical signal applied to the electrodes may produce a corona discharge, converting oxygen within the gas to ozone. The ozone flows out the passageway with whatever non-ozone gas exists.

The second tube may be made of glass, and the conducting cover of the second tube may be provided by an appropriate conducting material applied as a coating to the exterior surface of the glass tube, for example.

The ozone generator may be enclosed, at least in part, in a protective housing, with appropriate access to the two electrodes for application of electric signals thereto, as well as access to the central passage of the central tube at both ends of the central tube.

An electrical circuit may be provided for producing a high voltage pulsed ac signal to be applied to the electrodes of the generator. The ac pulses may be generated as output from a high voltage transformer. A dc voltage may be placed across the primary winding of this transformer, which is periodically shorted with the resulting ac pulse produced across the secondary winding. A silicon control rectifier may be periodically enabled to so short the primary winding of the transformer, with an oscillator providing a gating signal to periodically enable the silicon control rectifier. A variable frequency oscillator may be used to so control the silicon control rectifier, thereby allowing the frequency of the high voltage ac output pulses to be readily varied.

The present invention thus provides an ozone generating system, including a corona discharge generator which may be constructed compactly and operated at relatively high efficiency for production of ozone, and further provides, in a preferred embodiment, an electrical circuit which produces an output pulse signal for use in generating ozone whose frequency may be readily adjusted.

DESCRIPTION OF PREFERRED EMBODIMENTS

Figure 1:
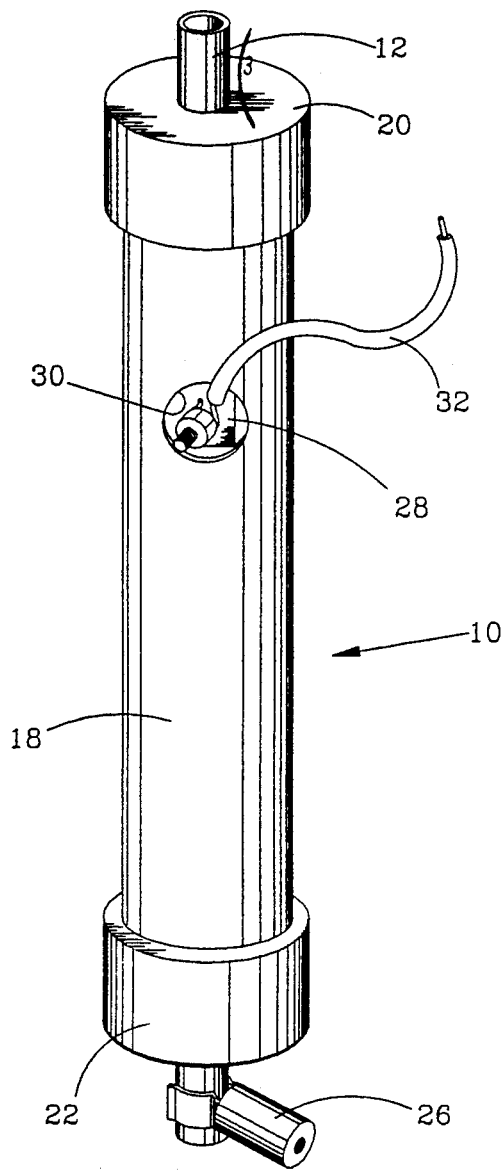
FIG. 1 is a perspective of an ozone generator according to the present invention.
Figure 2:
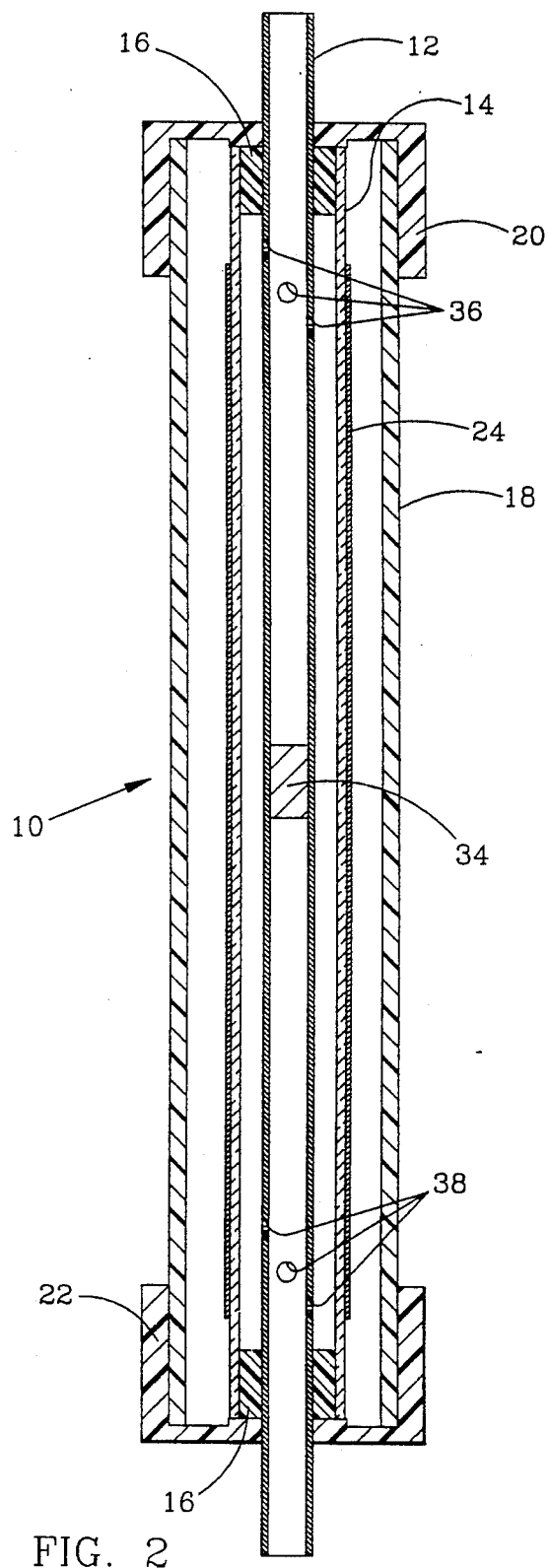
FIG. 2 is a longitudinal cross section of the ozone generator of FIG. 1, with the electrical terminals removed.

An ozone generator in the form of a corona discharge tube is shown generally at 10 in FIGS. 1 and 2. A central metal tube 12 extends through the center of the generator 10, and is surrounded by a glass second tube 14 of somewhat shorter length than the metal tube. Just inside each of the two ends of the glass tube 14 is an annular packing 16. The two packings 16 serve to seal the interior surface of the glass tubing 14 to the exterior surface of the metal tubing 12 to form an elongate, annular enclosure, and to maintain the metal tube centered along the interior of the glass tube, so that the two tubes are coaxial. The material of the packings 16 is also an electrical insulator.

The combination of the metal tube 12 and the glass tube 14 is enclosed within a tubular housing 18 which is approximately as long as the glass tubing. The ends of the housing 18 are closed by caps 20 and 22, which may be friction-fitted over the tube 18. The metal tube 12 is longer than the glass tube 14 as well as the housing tube 18, and extends through appropriate holes in the two end caps 20 and 22. The housing tube 18 and housing end caps 20 and 22 are constructed of electrically insulating material, such as polyvinylcholoride (PVC). The ends of the glass tube 14 abut the end caps 20 and 22 in the assembled configuration as illustrated in FIG. 2.

The exterior surface of the glass tube 14 is covered by an electrical conductor 24. Although the conductor 24 may be composed of a variety of materials, the conductor may be readily constructed by coating the exterior surface of the glass tube 14 with a graphite dispersion in liquid which may be dried to a continuous, fairly uniform conductive coating. Such a dispersion of colloidal graphite in water is sold under the trademark "Aquadag" though other graphite dispersions are available.

The metal tube 12 serves as one electrode, and the conductive coating 24 serves as another electrode surrounding the first electrode of the metal tube, and displaced therefrom by the radial distance between the exterior surface of the metal tube and the interior surface of the glass tube 14, and further by the thickness of the glass tube serving as an additional dielectric. As discussed more fully hereinafter, application of an appropriate voltage between the electrodes 12 and 24 produces a corona discharge within the glass tube 14, exterior to the metal tube. An electrical terminal 26 is shown in FIG. 1 clipped to the metal tube 12 beyond the end cap 22; another electrical terminal 28 may be clipped about the glass tube 14 to make electrical contact with the conductive coating 24, and is accessed through an appropriate hole 30 in the housing tube 18. An insulated electrical lead 32 is shown in FIG. 1 connected to the clipped electrode 28. The aforementioned voltage may be applied to the electrodes 12 and 24 by way of the terminals 26 and 28, respectively. The insulating housing in the form of the tube 18 and caps 20 and 22 provides a safety covering for the application of high voltages to the corona discharge tube, while also providing means for safely handling and mounting the corona discharge tube, for example. The exposed metal tube electrode 12 may be maintained at electrical ground, for example.

To produce ozone with the generator 10, oxygen or oxygen-containing gas, such as air, is introduced into the annular region between the exterior surface of the metal tube electrode 12 and the interior surface of the glass tube 14 wherein a corona discharge is formed. For this purpose, the interior of the metal tube 12 is closed by a plug 34 at or about the longitudinal center of the generator 10. The metal tube 12 is broken by one or more holes 36 (three are shown) just to the inside of the location of one of the packings 16. Similarly, the metal tube 12 is broken by one or more holes 38 (three are shown) just inside the position of the other packing 16 at the opposite end of the generator 10. Gas containing oxygen is made to flow along the interior of the tube 12 and thereby enter the generator 10 from one end thereof. The block 34 prevents the gas from flowing straight through the metal tube 12. Consequently, the input gas passes through the holes 36, for example, to the annular region between the exterior surface of the metal tube 12 and the interior surface of the glass tube 14. The gas then flows the length of this annular enclosure and re-enters the interior of the metal tube 12 through the holes 38, on the downstream side of the block 34. While the gas is within the enclosure between the exterior surface of the metal tube 12 and the interior surface of the glass tube 14, the aforementioned voltage may be applied to the electrodes 12 and 24 to produce the corona discharge within the oxygen-containing gas to effect the interaction which produces ozone. The ozone exits the generator 10 through the holes 38 and the downstream interior of the metal tube 12.

Since portions of the ozone generator 10 are exposed to ozone, materials may be selected for the construction of the exposed portions of the generator to eliminate, or at least minimize, any detrimental interactions with ozone. The metal tube 12 may be stainless steel, and the packings 16 may be formed, for example, of an electronic grade silicone adhesive which is both non-contaminating and relatively impervious to ozone. Such an adhesive cures to a sufficiently rigid consistency to at least help maintain the glass tube 14 positioned coaxially with the stainless steel tube 12. The plug 34 may also be stainless steel, or some other material which can both provide a gas-tight seal within the tube 12 and resist attack by ozone.

A well-annealed glass may be chosen for the tube 14, for example. The well known borosilicate glass commonly used in laboratory work and sold under the trademark "Pyrex" may be used for this purpose, for example.

The generator 10 may be constructed in a variety of sizes, including relatively small. For example, the generator 10 may be constructed with the metal tube 12 extending for approximately one foot in length, and extending five-sixteenth inch across. The glass tube 14 and surrounding housing tube 18 may extend approximately nine and one-half inches in length. The annular spacing between the metal tube 12 and the interior surface of the glass tube 14 may, for example, be approximately three-eighths inch with a glass tube approximately three-quarters of an inch in outer diameter, for example. The interior diameter of the housing tube 18, for example, may be one and one-half inches. With such dimensions, the applied voltage to produce the corona discharge within the generator may be on the order of ten to twenty thousand volts, for example. The gas flow holes 36 and 38 may, for example, be on the order of one-eighth inch in diameter.

Figure 3:
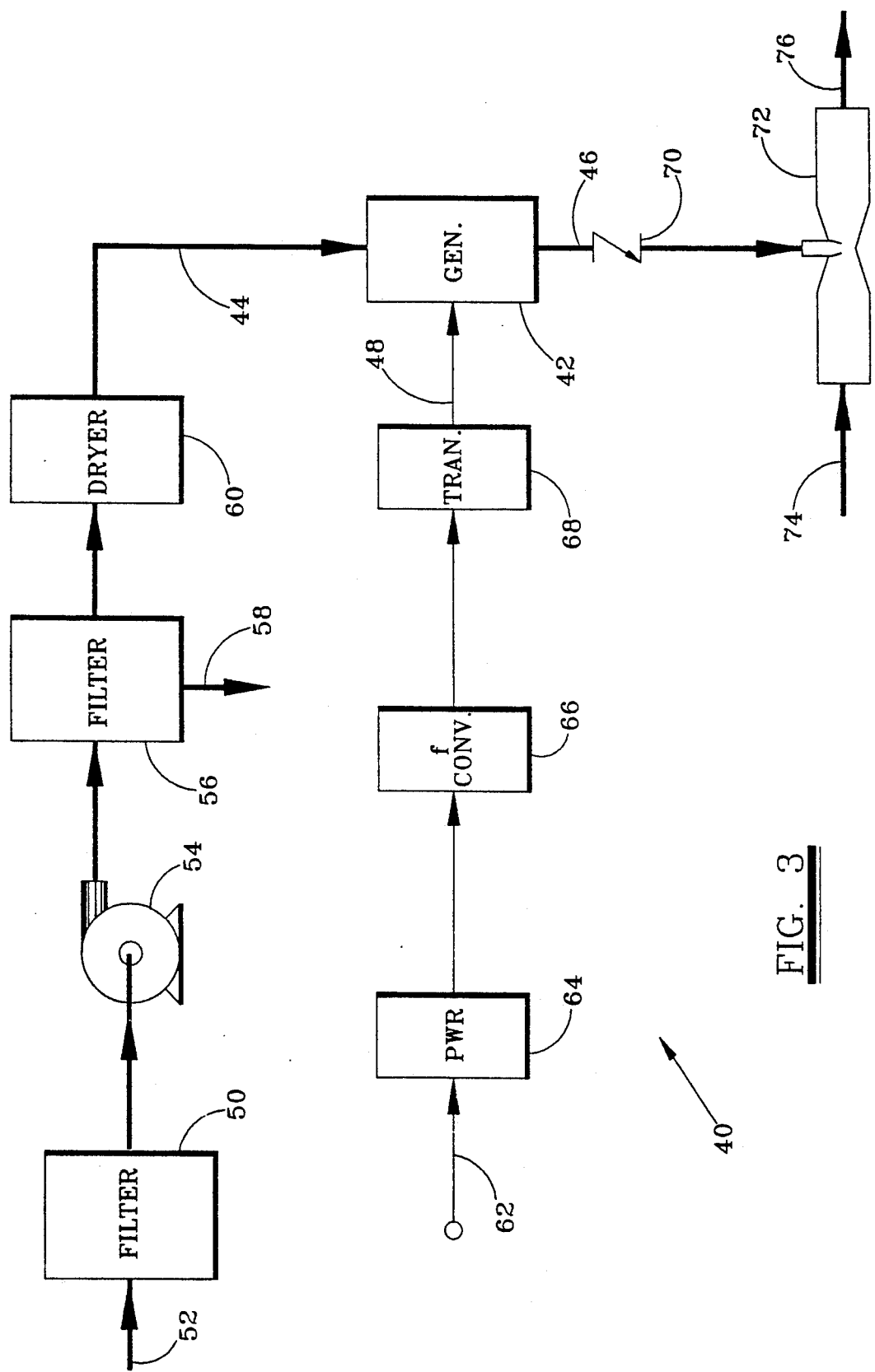
FIG. 3 is a schematic representation of an ozone generation system.

A system for generating ozone is shown generally at 40 in FIG. 3, and includes an ozone generator 42 which may be of the type illustrated in FIGS. 1 and 2. Oxygen, or oxygen-containing gas, is made to flow into the generator 42 as at 44, and ozone, or ozone-containing gas is output from the generator at 46. The ozone generator 42 is operated, or driven, by an input electrical signal, as at 48, to produce the discharge which effects the production of the ozone.

A clean, relative dry stream of gas input at 44 to the generator 42 is preferred for efficient production of ozone with little or no contamination of the system. To achieve this condition, the input gas may be appropriately treated. For example, gas, such as air, may be passed through a first filter 50 as at 52 to generally clean the air by removing particles therefrom. Such a particulate filter may include a mesh, or one or more screens or the like, whose flow passages are sufficiently small to stop particles down to some selected minimum size.

Output from the particulate filter 50 is directed to a compressor 54 of the oilless type to drive the flow of gas along the system. For a generator of the type illustrated in FIGS. 1 and 2 with the typical dimensions discussed above, the output of the compressor 54 may typically have a flow rate of six to eight cubic feet per minute, and a pressure of approximately two atmospheres. The compressor itself need only be one-sixth or one-third horsepower to supply one, or even several, such sized ozone generators. Tubing utilized to conduct the gas flow leading up to input to the generator 42 may be five-sixteenth or three-eighths inch internal diameter for such sized generator.

Output flow from the generator 54 is directed to a second filter 56 designed to remove vapor, such as oil and/or water vapor, from the air, for example. Such a filter may include a bed of brass pellets so that the gas being filtered is exposed to a large surface area of brass. The contaminate fluid collected by the filter 56 is permitted to drain as at 58. The gas is further dried in a drier 60 which includes a desiccant such as activated charcoal or silica gel, for example. Additional filtering and/or drying may be utilized as needed. The gas thus cleansed is input into the generator 42 as at 44.

Input power (typically 115 volts at 60 Hz) is provided at 62 to a power supply 64 whose generated signal is preferably able to be varied in frequency, such as by a frequency converter or variable frequency oscillator 66. The signal 48 input to the ozone generator 42 is taken across the secondary of a high voltage transformer 68. As discussed more fully below, the signal 48 may be in the form of a pulsed signal, with each pulse in the form of a damped oscillating ac signal. The frequency of the pulses may be varied to control the rate of ozone production, for example.

With the pulse signal 48 applied to the corona discharge tube of the generator 42, the gas flow through the generator emerges at 46 with a concentration of ozone. Thereafter, the ozone may be utilized in a variety of applications. In certain applications, the ozone or ozone-containing gas, such as air, is preferably mixed with a liquid which may then be readily conveyed and applied in a variety of ways, such as by spraying, washing, soaking, etc.

To prevent any possible backflow of the ozone output 46 into the generator 42, a check valve 70 may be utilized in the output flow line as illustrated in FIG. 3. For mixing with a liquid, the output of the check valve 70 may be introduced into an injector 72. The liquid into which the ozone is to be mixed is input at 74 to the injector 72. Within the injector, the liquid flow line is constricted at the point of junction with the gas inlet port. The resulting increased velocity of the liquid passing the opening to the gas line provides a suction effect which draws the ozone/gas into the liquid. Thereafter, the cross section of the flow line for the gas/liquid combination is increased so that the flow velocity of the output of the injector at 76 is reduced, possibly to that of the input liquid flow velocity at 74. The output 76 of the injector 72 thus comprises liquid with entrained ozone for application of the ozone as desired.

The injector 72 may also include a check valve so that the external check valve 70 serves as a back up. The check valves prevent moisture from backing into the generator, for example, when the system is shut down so that there is not enough fluid pressure to prevent liquid from getting into the ozone generator.

The apparatus through which the ozone is conducted may be constructed from materials selected for minimal or no detrimental interaction with ozone, particularly the materials of the apparatus exposed to ozone directly, or to ozone carried by other gas. Thus, the flow line from the generator 42 to the injector 72 may be stainless steel. If a flexible flow line is required, tubing made from a corrosion resistant material, such as a vinyl compound tubing sold under the trademark "Tygon," for example, may be used.

Figure 4:
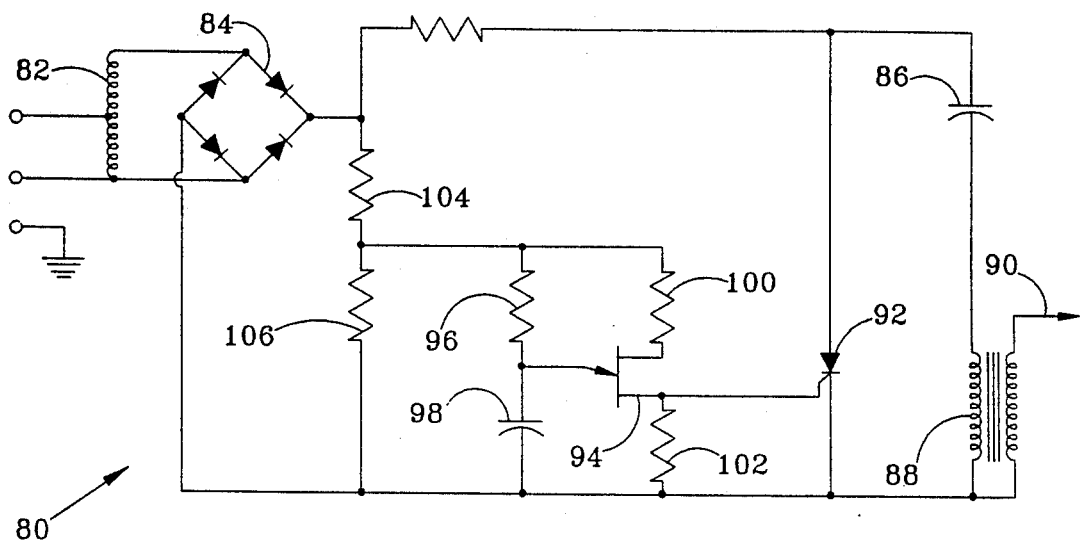
FIG. 4 is a diagram of an electrical circuit according to the present invention for driving the ozone generator in FIGS. 1 and 2.

An electrical power supply and triggering circuit for operating a corona discharge ozone generator such as the generator 10 of FIGS. 1 and 2, and which may be used in the system 40 as at 42, is shown in schematic at 80 in FIG. 4. Input power, such as 115 volts at 60 Hz, is applied to an input transformer, or other inductor, 82 whose output is placed across a diode bridge 84. The full-wave rectified, unfiltered dc voltage output of the bridge 84 is applied, thorough a coupling capacitor 86, to the primary winding of a high voltage output transformer 88. The output signal of the circuit 80 is taken at 90 across the secondary winding of the output transformer 88. The output signal 90 is obtained upon the collapse of the voltage across the primary of the transformer 88 which is effected by the shorting of the transformer primary by means of the silicon control rectifier (SCR) 92. Application of a positive pulse to the gate of the SCR 92 enables the SCR, thus shorting the coupling capacitor 86 and the primary of the output transformer 88.

The SCR 92 is operated by a relaxation oscillator comprising a unijunction transistor 94, a resistor 96 and a capacitor 98. The relaxation oscillator produces a short duration pulse due to current flowing through the transistor 94 and the two current-limiting resistors 100 and 102. Cyclical pulsing comes about due to the repeated charging and discharging of the capacitor 98. The resistors 104 and 106 set the voltage at which the relaxation oscillator operates.

On a periodic basis, determined by the frequency of operation of the relaxation oscillator which, in turn, is determined by the values of the resistor 96 and the capacitor 98, the SCR 92 is periodically enabled to short the primary of the output transformer 88. The collapsing signal across the transformer primary produces an output signal across the transformer secondary. The typical applied voltage to the primary may be on the order of 100 or so volts; however, the output signal on the stepped up secondary of the transformer may be on the order of 15,000 volts to 20,000 volts, for example. The output signal 90 is in the form of pulses, with a pulse produced each time the transformer primary is so shorted through the SCR 92. However, due to the self inductance of the transformer 88, the pulse experiences a ringing effect. Thus, the pulse form is generally a decreasing ac signal whose envelope shape is generally exponential, and which is symmetric around zero volts.

Figure 5:
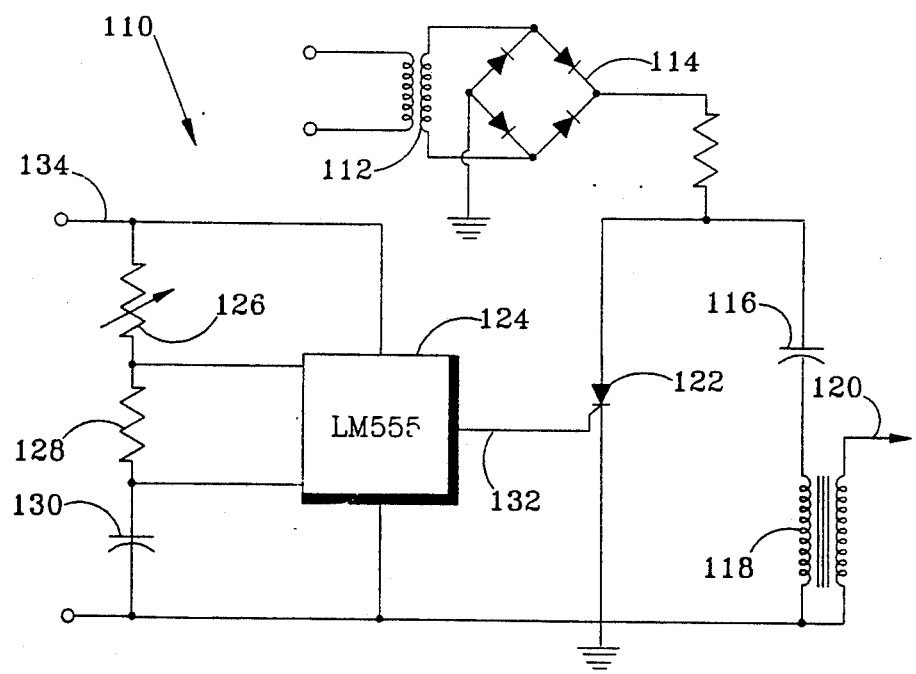
FIG. 5 is another embodiment of an electrical circuit according to the present invention for driving the ozone generator of FIGS. 1 and 2.

Another version of an electrical circuit to drive a corona discharge ozone generator, such as that illustrated in FIGS. 1 and 2 and shown at 42 in FIG. 3, is illustrated generally at 110 in FIG. 5. In the circuit 110, the frequency of the pulses of the output signals of the circuit may be readily varied.

In the circuit 110, input power (115 volts at 60 Hz, for example) is applied to an input transformer 112; the output of the transformer is applied across a diode bridge 114 to provide fullwave rectified, but unfiltered, dc output. The bridge output signal is applied through a coupling capacitor 116 to the primary winding of a high voltage output transformer 118. Again, collapse of the dc signal across the primary winding of the output transformer 118 produces a high voltage (on the order of 15,000 to 20,000 volts, for example) pulse output signal 120 from the transformer secondary for application across the electrodes of a corona discharge ozone generator. An SCR 122 is positioned to short the capacitor 116 and the primary of the transformer 118 periodically as an enabling pulse is applied to the gate of the SCR. A variable frequency relaxation oscillator, comprising an integrated circuit 124 and a voltage divider including a variable resistor 126 and a fixed resistor 128, and a capacitor 130 provides the pulsing signal at 132 to the SCR 122. The operating voltage for the integrated circuit 124 is applied at 134; the voltage divider resistors 126 and 128 are connected to control voltage inputs to the integrated circuit. Variation of the variable resistor 126 selectively varies the frequency of the output pulses 132 of the integrated circuit 124 and, therefore, the frequency of pulsing of the high voltage circuit output 120.

Typically the SCR used in either of the two circuits of FIGS. 4 or 5 may be that identified as 2N3899, the unijunction transistor of FIG. 4 may be a 2N2646, and the integrated circuit used to produce the variable frequency pulsing of the circuit of FIG. 5 may be that commonly referred to as LM555.

In the corona discharge ozone generator, ozone is generated during application of the high voltage pulse between the electrodes of the generator. For a given rate of flow of oxygen-containing gas into the corona discharge region of the ozone generator, the amount of ozone that is generated in a given period of time increases with the portion of that time that the pulses are in existence. Consequently, by increasing the pulse frequency produced by the circuit of FIG. 5, the rate of ozone production may be increased.

The present invention thus provides a corona discharge-type ozone generator which may be constructed of relatively compact size. Further, the ozone generator of FIGS. 1 and 2 can accommodate a relatively rapid flow of gas therethrough to increase the efficiency of production of ozone and, at the same time, minimize the heating of the device. Consequently, no coolants need be applied to the ozone generator to overcome any excess heat generation.

The present invention further provides electronic circuitry for driving the ozone generator with pulses structured with ac, again to provide ozone generation with increased efficiency. Further, in one embodiment of the electronic circuitry, the frequency of pulses to the ozone generator may be readily varied to selectively adjust the rate of production of ozone in the generator, even for a fixed flow of gas therethrough.

The foregoing disclosure and description of the invention is illustrative and explanatory thereof, and various changes in the method steps as well as in the details of the illustrated apparatus may be made within the scope of the appended claims without departing from the spirit of the invention.

What is claimed:

1. Apparatus for generating ozone, including an electrical circuit providing a signal for application across electrodes for generation of ozone, comprising:
   a. an output transformer, stepped up to provide a high voltage output signal across the secondary winding of the transformer in response to variation in a relatively low voltage dc signal across the primary winding of the transformer;
   b. a power supply for applying such a relatively low voltage dc signal across the primary winding;
   c. a silicon control rectifier in parallel with the primary winding of the transformer for providing a short across the primary winding of the transformer when the silicon control rectifier is enabled; and
   d. a variable frequency oscillator for producing a pulsed gating signal for periodically enabling the silicon control rectifier so that the primary winding of the transformer is periodically shorted, thereby producing a pulsed output signal from the secondary winding of the transformer, with the frequency of the pulses being set by the frequency of the oscillator.

2. Apparatus as defined in claim 1 further comprising:
   a. a central tube of electrically conducting material;
   b. a second tube of generally non-electrically conducting dielectric material, of greater diameter than the central tube and positioned coaxial therewith, so that the second tube generally surrounds the central tube;
   c. a cover comprising electrically conducting material positioned on the outside of the second tube;
   d. seals positioned within each end of the second tube, comprising electrically insulating material, sealing the interior surface of the second tube to the exterior surface of the central tube toward each end of the second tube, whereby an annular enclosure is formed between the exterior surface of the central tube and the interior surface of the second tube, and between the two seals; and
   e. one or more passages through the wall of the central tube located toward opposite ends of the second tube and within the longitudinal extent of the annular enclosure, and a blockage within the central tube positioned between the two sets of passages;
   f. a fluid flow path thus formed along the interior of the central tube to the first passage, therethrough to the annular enclosure and on to the second passage, and therethrough into the interior of the central tube on the opposite side of the blockage.

3. Apparatus as defined in claim 2 wherein the conductive cover comprises a coating of conductive material on the exterior surface of the second tube.

4. Apparatus as defined in claim 2 further comprising a housing generally circumscribing the second tube and radially displaced therefrom.

5. Apparatus as defined in claim 2 wherein said second tube comprises a glass tube.

6. Apparatus as defined in claim 1 wherein the output signal from the transformer is connected to the central tube and the conductive coating acting as electrodes, to apply an electric field across the enclosure while oxygen is positioned therein, to produce ozone.

7. Apparatus as defined in claim 6 wherein the pulses of the electrical signal output from the transformer are ac.

8. Apparatus as defined in claim 1 wherein the variation of the frequency of the pulses output from the transformer affects the rate of production of ozone.

* * * * *

UNITED STATES PATENT AND TRADEMARK OFFICE
CERTIFICATE OF CORRECTION

PATENT NO. : 5,268,151
DATED : December 7, 1993
INVENTOR(S) : Bruce A. Reed, deceased, and Donald R. Randall It is certified that error appears in the above-indentified patent and that said Letters Patent is hereby corrected as shown below:

Column 9,

In Claim 6, at line 1, change "1" to - - 2 - -.
In Claim 7, at line 1, change "6" to - - 1 - -.

Signed and Sealed this

Tenth Day of September, 1996

Attest:

BRUCE LEHMAN

Attesting Officer   Commissioner of Patents and Trademarks